United States Patent
Kuwada et al.

[11] 3,900,490
[45] Aug. 19, 1975

[54] ANTIINFLAMMATORY AND ANALGESIC OXADIAZOLO BENZODIAZOCINONES

[75] Inventors: Yutaka Kuwada; Hideaki Natsugari; Kanji Meguro, all of Hyogo, Japan

[73] Assignee: Takeda Chemical Industries, Ltd., Japan

[22] Filed: Nov. 12, 1973

[21] Appl. No.: 414,843

[30] Foreign Application Priority Data
Nov. 13, 1972  Japan.............................. 47-113600
Dec. 12, 1972  Japan.............................. 47-124553

[52] U.S. Cl. ........ 260/307 A; 260/239 BD; 424/272
[51] Int. Cl.² ...................................... C07D 498/04
[58] Field of Search ................................ 260/307 A

[56] References Cited
OTHER PUBLICATIONS
Hester et al., Tetrahedron Lett., 1971, (20), pp. 1609–1611.

Primary Examiner—Donald G. Daus
Assistant Examiner—Raymond V. Rush
Attorney, Agent, or Firm—Wenderoth, Lind & Ponack

[57] ABSTRACT
Compounds of the formula;

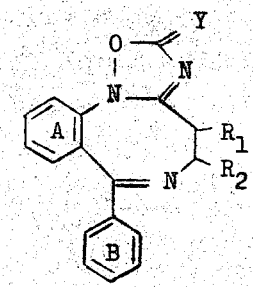

wherein Y is O or S, $R_1$ and $R_2$ are hydrogen or lower alkyl, rings A and B may be substituted by halogen, nitro, trifluoromethyl, lower alkyl or lower alkoxy and their pharmaceutically acceptable salts, which are useful as analgesics, anti-inflammatory agent, etc., and are prepared by reacting the following compounds with a carbonylating or thiocarbonylating agent;

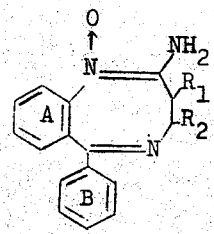

22 Claims, No Drawings

ANTIINFLAMMATORY AND ANALGESIC OXADIAZOLO BENZODIAZOCINONES

The present invention relates to compounds of the following general formula

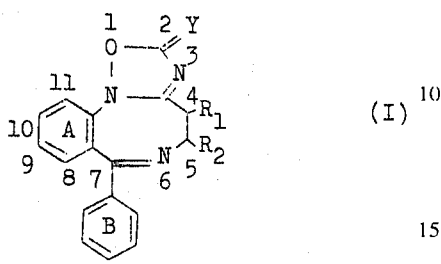

(I)

wherein Y is O or S, $R_1$ and $R_2$ are hydrogen or lower alkyl, and rings A and B are unsubstituted or substituted by halogen, nitro, trifluoromethyl, lower alkyl, or lower alkoxy, and their pharmaceutically acceptable salts.

The present invention also relates to a method for the production of the above compounds.

These compounds show excellent analgesic and anti-inflammatory activites, and thus by virtue of these activities, they are useful as analgesics, anti-inflammatory agents, etc.

In the above formula (I), the lower alkyl shown by $R_1$ or $R_2$ is preferably one having 1 to 2 carbon atoms, i.e. methyl and ethyl.

The rings A and B are unsubstituted or substituted by one or more substituents at their optional position or positions. The halogen substituted on the ring A or B includes chlorine, bromine, iodine and fluorine. The lower alkyl substituted on the ring A or B is preferably one having 1 to 4 carbon atoms, such as methyl, ethyl, n-propyl, i-propyl, n-butyl, t-butyl, etc. The lower alkoxy substituted on the ring A or B is preferably one having 1 to 4 carbon atoms, such as methoxy, ethoxy, n-propoxy, i-propoxy, n-butoxy, t-butoxy, etc.

The pharmaceutically acceptable salts include inorganic acid salts (e.g. hydrochloride, hydrobromide, sulfate, phosphate, etc.) and organic carboxylic acid salts (e.g. acetate, oxalate, malonate, succinate, malate, maleate, tartrate, etc.).

The compounds of the above formula (I) are prepared by reacting compounds of the following general formula (II) with a carbonylating or thiocarbonylating agent;

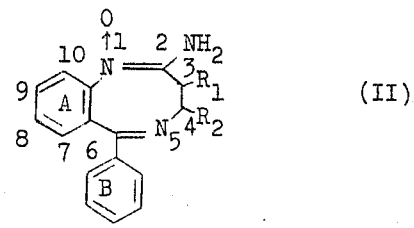

(II)

wherein the symbols have the same meaning as defined above, and the compounds of the formula (II) are prepared by oxidation of compounds of the following formula (III)

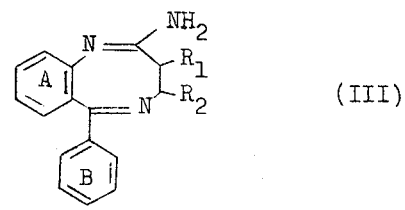

(III)

wherein the symbols have the same meaning as defined above.

The method in the present invention invention is illustrated as follows;

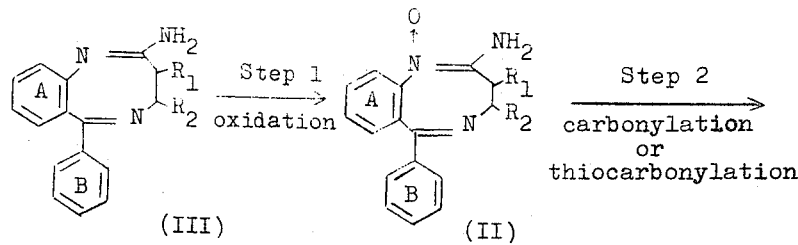

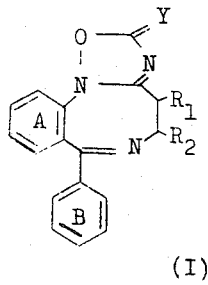

(I)

In the following are given the detailed explanations of the respective reaction steps 1 and 2.

STEP 1

The oxidation of the compounds (III) is conducted by reacting an oxidizing agent with the compounds (III). The oxidizing agent usable in this method is preferably selected from rather mild ones. For example, peracids are desirably used in this method. The typical examples of the peracids are organic percarboxylic acids such as performic acid, peracetic acid, pertrifluoroacetic acid, perbenzoic acid or substituted perbenzoic acids which contain, in its phenyl ring, such substituents as halogen (e.g. chlorine, bromine, etc.), lower alkyl (e.g. methyl, ethyl, n-propyl, etc.), lower alkoxy (e.g. methoxy, ethoxy, n-propoxy, etc.), nitro, carboxyl, and so on, the number of the substituents being one or more. In place of using the peracid, hydrogen peroxide and an organic acid may be used, the organic acid being exemplified by formic acid, acetic acid, trifluoroacetic acid, benzoic acid, and the like.

An amount of the oxidizing agent to be used is about 1 to about 10 mole parts, preferably about 1.1 to about 3 mole parts per mole part of the compounds (III).

The oxidation is usually conducted at about −10° to about 100°C, more preferably about 0° to about 30°C, in the presence of a solvent. The solvent includes alcohols (e.g. methanol, ethanol, propanol, etc.), ethers (e.g. diethylether, dioxane, etc.), hydrocarbons (e.g. n-hexane, benzene, toluene, etc.), halogenated hydrocarbons (e.g. carbon tetrachloride, chloroform, dichloromethane, etc.), ketones (e.g. acetone, methylethyl ketone, etc.), amides (e.g. dimethylformamide, hexamethylenephosphoramide, etc.), and lower organic carboxylic acids (e.g., formic acid, acetic acid, trifluoroacetic acid, etc.).

In this oxidation, the compound (II) is obtained as an acid addition salt with an acid used or one which is produced from the peracid employed as an oxidizing agent. This salt may be converted to a free form after a conventional neutralization technique using strong basic ionexchange resins, alkali hydroxides (e.g. sodium hydroxide, potassium hydroxide, etc.), alkali carbonates (e.g. sodium carbonate, potassium carbonate, etc.), alkali bicarbonates (e.g. sodium bicarbonate, potassium bicarbonate, etc.) or quaternary ammonium hydroxides.

The resulting compounds (II) can be purified by a conventional manner such as recrystallization, column chromatography, etc. The compounds (II) can be changed in a form of a salt with a suitable acid such as hydrochloric acid, hydrobromic acid, sulfuric acid, phosphoric acid, acetic acid, oxalic acid, palmitic acid, succinic acid, tartaric acid, malic acid, maleic acid, benzoic acid, salicylic acid, methanesulfonic acid, p-toluenesulfonic acid, etc.

The compounds (II) can form a tautomer as below;

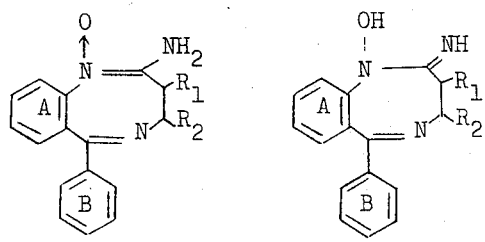

Thus obtained compounds (II) are useful as starting materials for the syntheses of the compounds (I), and further the compounds (II) themselves show analgesic and anti-inflammatory activites, and thus can be used as analgesics and anti-inflammatory agents. When the compounds (II) are used as analgesics and anti-inflammatory agents, these compounds as such or in the form of a conventional pharmaceutically acceptable composition such as powder, granules, injection solution, tablets, etc., together with pharmaceutically acceptable carriers or adjuvants are administered orally or parenterally. The daily dose is about 1 to about 100 mg/adult human for oral administration.

STEP 2

The compounds thus obtained in the above step are then reacted with a carbonylating or thiocarbonylating agent. The carbonylating or thiocarbonylating agent in this invention means such reagents that react with the compound (II) to link the oxygen atom at the 1-position and nitrogen atom of the amino group at the 2-position with each other through a carbonyl or thiocarbonyl group.

The carbonylating or thiocarbonylating agents usable in the method are, for example, compounds shown by the following general formula

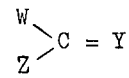

wherein Y is O or S, and W and Z are, same or different, halogen (e.g. chlorine, bromine, etc.), lower alkoxy (e.g. methoxy, ethoxy, n-propoxy, n-butoxy, etc.), amino, lower alkylamino (e.g. methylamino, ethylamino, n-propylamino, n-butylamino, dimethylamino, diethylamino, etc.), imidazolyl, lower alkyl substituted imidazolyl (e.g. methyl imidazolyl, ethyl imidazolyl, etc.), including a case where

is RNC= (wherein R means alkyl, e.g. methyl, ethyl, propyl, hexyl etc., aryl, e.g. phenyl, etc., and aralkyl, e.g. benzyl, etc.).

Typical examples of the compounds are carbonic or thiocarbonic acid dihalides (e.g. phosgene, thiophosgene, etc.), ester-halides (e.g. methyl chlorocarbonate, ethyl chlorocarbonate, etc.), diesters (e.g. dimethyl carbonate, diethyl carbonate, xanthogenic acid, etc.), diamides (e.g. urea, thiourea, dimethylurea, N,N'-carbonyldiimidazole, N,N'-thiocarbonyl diimidazole, N,N'-carbonylbis(2-methylimidazole), N,N'-thiocarbonylbis(2-methylimidazole), etc., and imides (e.g. methylisocyanate, methyl isothiocyanate, phenylisocyanate, phenylisothiocyanate, benzylisocyanate, benzylisothiocyanate, etc.).

An amount of the carbonylating or thiocarbonylating agent to be used is about 1 to about 10 mole parts, preferably about 1 to about 3 mole parts per mole part of the compound (II).

When a carbonylating or thiocarbonylating agent containing halogen atom or atoms in its molecule is used, it is preferable to allow a base to exist in the reaction system. The base includes organic bases such as aliphatic amines (e.g. triethylamine, tributylamine), heterocyclic amines (e.g. pyridine, 2-hydroxypyridine, imidazole, 2-methylimidazole), etc., and inorganic bases such as alkali hydroxides (e.g. sodium hydroxide, potassium hydroxide), alkali carbonates (e.g. sodium carbonate, potassium carbonate), alkali bicarbonates (e.g. sodium bicarbonate, potassium bicarbonate), etc.

The reaction is conducted at about −20° to about 150°C in the presence of a solvent such as aromatic hydrocarbons (e.g. benzene, toluene, xylene), halogenated hydrocarbons (e.g. dichloromethane, chloroform, carbon tetrachloride), esters (e.g. ethyl acetate), ketones (e.g. acetone), ethers (e.g. ethyl ether, tetrahydrofuran), amines (e.g. triethylamine, pyridine), etc.

The resulting product can be recovered and purified in a conventional manner such as recrystallization, chromatography, etc. The product may be changed to, if required, a salt with an acid such as inorganic acids (e.g. hydrochloric acid, hydrobromic acid, sulfuric acid, phosphoric acid) and organic acids (e.g. acetic acid, oxalic acid, malonic acid, succinic acid, malic acid, maleic acid, tartaric acid) after a conventional manner.

The compounds (I) or their pharmaceutically acceptable salts are useful as analgesics or antiinflammatory agents. agents are When the compounds (I) or their pharmaceutically acceptable salts are used as analgesics or antiinflammatory agents, as such or in the form of conventional compositions such as powder, granules, injection solution, tablets, etc., together with pharmaceutically acceptable carriers or adjuvants are administered orally or parenterally. The daily dose is about 1 to about 200 mg/adult human for oral administration.

Some examples of practical recipes in which the compounds of this invention are utilized as analgesics or anti-inflammatory agentsare as follows;

Tablet:
| | | |
|---|---|---|
| 9-chloro-4,5-dihydro-7-phenyl-2H-(1,2,4)oxadiazolo(2,3-a)(1,5)benzodiazocin-2-one | 5 | mg |
| lactose | 60 | mg |
| corn starch | 33.5 | mg |
| gelatin | 1 | mg |
| magnesium stearate | 0.5 | mg |
| | 100 per tablet | mg |

Tablet:
| | | |
|---|---|---|
| 9-chloro-4,5-dihydro-4-methyl-7-phenyl-2H-(1,2,4)oxadiazolo-(2,3-a)(1,5)benzodiazocin-2-one | 10 | mg |
| lactose | 60 | mg |
| corn starch | 28.5 | mg |
| gelatin | 1 | mg |
| magnesium stearate | 0.5 | mg |
| | 100 per tablet | mg |

In the following, working Examples are given for further explanation of the present invention. In the examples, "parts(s)" means "weight part(s)" unless otherwise specified. Relation between "weight part" and "volume part" is the same with that betewen "gram" and "milliliter."

EXAMPLES

Part A: Preparation of the compounds (II)

(1) To a suspension of 1.42 part of 2-amino-8-chloro-3,4-dihydro-6-phenyl-1,5-benzodiazocine in 30 volume parts of benzene is added 1.3 g of m-chloroperbenzoic acid and the mixture stirred at room temperature for 40 minutes. Solvent is evaporated and the residue is treated with ethyl ether to give colorless crystals of m-chlorobenzoic acid salt of 2-amino-8-chloro-3,4-dihydro-6-phenyl-1,5-benzodiazocine 1 N-oxide. Recrystallization from acetone-ethyl ether gives colorless needles melting at 95° to 97°C.

Elementary analysis $C_{16}H_{14}ClN_3O \cdot C_7H_5ClO_2$.
Calculated: C 60.53, H 4.19, N 9.20.
Found: C 60.20, H 4.19, N 9.06.

0.5 Part of the above crystals is added on a column packed with 5 volume parts of Amberlite IRA 400 (OH⁻ type) and then the column eluted with methanol. Solvent is removed from the eluate and the residue treated with ethyl ether.

This procedure gives crystals of 2-amino-8-chloro-3,4-dihydro-6-phenyl-1,5-benzodiazocine 1 N-oxide. Recrystallization from water gives colorless flakes (one-fourth hydrate), melting at 144° to 145°C (decomposition).

Elementary analysis $C_{16}H_{14}ClN_3O_2 \cdot \frac{1}{4} H_2O$.
Calculated: C 63.16, H 4.81, N 13.81.
Found: C 63.03, H 4.77, N 13.76.
Mass spectrum. m/e 301,299(M⁺).

(2) To a suspension of 10 parts of 2-amino-8-chloro-3,4-dihydro-6-phenyl-1,5-benzodiazocine, 200 volume parts of Amberlite IRA 400 (OH⁻type) and 200 volume parts of methanol is added 10 parts of m-chloroperbenzoic acid with stirring at room temperature. After 15 minutes, the resultant mixture is filtered and the filtrate is concentrated under reduced pressure. The residue is washed with acetone and dried to give colorless crystals (one-fourth hydrate) of 2-amino-8-chloro-3,4-dihydro-6-phenyl-1,5-benzodiazocine 1 N-oxide, melting at 140° to 142°C. IR absorption spectrum of this product is identical with that of the product obtained in Part A(1).

(3) In a similar manner to the foregoing examples, the following compounds are prepared;

. 2-amino-3,4-dihydro-6-phenyl-1,5-benzodiazocine 1 N-oxide; colorless prisms (mono methanol solvate) melting at 122° to 123°C(decomposition)(recrystallization from methanol-acetone)

. 2-amino-8-chloro-3,4-dihydro-3-methyl-6-phenyl-1,5-benzodiazocine 1 N-oxide; m-chlorobenzoic acid salt melting at 183° to 184°C, colorless needles (recrystallization from acetone); free form melting at 202° to 203°C(decomposition, pale yellow needles (recrystallization from methanolacetone)

. 2-amino-8-chloro-3,4-dihydro-3-ethyl-6-phenyl-1,5-benzodiazocine 1 N-oxide; pale yellow needles melting at 202° to 203°C (recrystallization from methanol-acetone)

. 2-amino-8-chloro-3,4-dihydro-4-methyl-6-phenyl-1,5-benzodiazocine 1 N-oxide; pale yellow prisms (mono hydrate) melting at 215° to 216°C(recrystallization from methanolacetone)

. 2-amino-3,4-dihydro-3,8-dimethyl-6-phenyl-1,5-benzodiazocine 1 N-oxide; colorless needles (mono hydrate) melting at 138° to 140°C (recrystallization from methanolacetone)

. 2-amino-3,4-dihydro-3-ethyl-8-methyl-6-phenyl-1,5-benzodiazocine 1 N-oxide; pale yellow needles melting at 204° to 205°C (recrystallization from methanol-acetone)

. 2-amino-3,5-dihydro-8,9-dimethoxy-6-phenyl-1,5-benzodiazocine 1 N-oxide; colorless needles (1/2 hydrate) melting at 196° to 198°C (recrystallization from methanolethyl acetate)

. 2-amino-8-chloro-6-(4-chlorophenyl)-3,4-dihydro-3-methyl-1,5-benzodizocine 1 N-oxide; pale yellow needles (mono methanol solvate) melting at 141° to 142°C (decomposition) (recrystallization from methanol-ethyl acetate)

. 2-amino-8-chloro-3,4-dihydro-6-(4-methoxyphenyl)-1,5-benzodiazocine 1 N-oxide; colorless needles (mono hydrate) melting at 138° to 139°C (decomposition) (recrystallization from methanol-acetone)

. 2-amino-8-chloro-3,4-dihydro-10-methoxy-6-phenyl-1,5-benzodiazocine 1 N-oxide; colorless needles (mono methanol solvate) melting at 157° to 159°C (decomposition) (recrystallization from methanol-acetone)

Part B: Preparation of the compounds (I)

(1) To a solution of 7 parts of 2-amino-8-chloro-3,4-dihydro-6-phenyl-1,5-benzodiazocine 1 N-oxide in 200 volume parts of chloroform is added 7 volume parts of triethylamine and further added under ice-cooling with stirring a mixture of 130 volume parts of chloroform and 30 volume parts of toluene containing 10 percent (w/w) of phosgene. After 1 hour, water is added to the resultant mixture and the mixture is extracted with chloroform. The chloroform layer is washed with water and dried over sodium sulfate. Evaporation of the solvent from the resultant gives crystals of 9-chloro-4,5-dihydro-7-phenyl-2H-(1,2,4)oxadiazolo(2,3-a)-(1,5)benzodiazocin-2-one. Melting point: 167° to 168°C (decomposition). Recrystallization from acetone-n-hexane gives colorless prisms melting at 171° to 172°C(decomposition).

---

Elementary analysis $C_{17}H_{12}ClN_3O_2$.
Calculated: C 62.67, H 3.71, N 12.89.
Found: C 62.89, H 4.02, N 12.67.

---

(2) To 17 parts of m-chlorobenzoic acid salt of 2-amino-8-chloro-3,4-dihydro-6-phenyl-1,5-benzodiazocine 1 N-oxide in 200 volume parts of tetrahydrofuran are added simultaneously 15 parts of triethylamine in 15 parts of tetrahydrofuran and 30 volume parts of toluene containing 10 percent (w/w) of phosgene, under ice-cooling with stirring. After 1 hour, the mixture is partitioned between water and ethyl acetate. The ethyl acetate layer is separated, washed with water and dried over sodium sulfate. Evaporation of the solvent under reduced pressure gives colorless crystals of 9-chloro-4,5-dihydro-7-phenyl-2H-(1,2,4)-oxadiazolo(2,3-a)(1,5)benzodiazocin-2-one. Melting point: 172° to 173°C (decomposition). The IR absorption spectrum of this product is identical with that of the product obtained in Part B(1).

(3) To a solution of 0.15 part of 2-amino-8-chloro-3,4-dihydro-6-phenyl-1,5-benzodiazocine 1 N-oxide, 0.24 part of 2-methylimidazole and 5 volume parts of chloroform is added a mixture of 2 volume parts of chloroform and 1 volume part of toluene containing 10 percent (w/w) of phosgene with stirring at room temperature. After 1 hour, water is added to the resultant mixture, and the mixture is extracted with chloroform. The chloroform layer is washed with water and dried over sodium sulfate. Evaporation of the solvent from the resultant gives crystals of 9-chloro-4,5-dihydro-7-phenyl-2H-(1,2,4)oxadiazolo(2,3-a)(1,5)benzodiazocin-2-one. Melting point: 167° to 169°C (decomposition). IR absorption spectrum of this product is identical with that of the product obtained in Part B(1).

(4) To 0.15 part of 2-amino-8-chloro-3,4-dihydro-6-phenyl-1,5-benzodiazocine 1 N-oxide in 6 volume parts of tetrahydrofuran is added 0.13 part of N,N-carbonyl-bis-(2-methylimidazole), followed by refluxing for 15 minutes. The solvent is evaporated and water is added to the residue. The resulting precipitates are collected by filtration and, washed with ether and then with acetone, and dried. This procedure gives crystals of 9-chloro-4,5-dihydro-7-phenyl-2H-(1,2,4)oxadiazolo(2,3-a)(1,5)benzodiazocin-2-one. Melting point: 166° to 168°C (decomposition).

IR adsorption spectrum of this product is identical with that of the product obtained in Example 1.

(5) To 0.15 part of 2-amino-8-chloro-3,4-dihydro-6-phenyl-1,5-benzodiazocine 1 N-oxide in 5 volume parts of benzene is added 0.06 volume part of methylisocyanate, followed by refluxing for 2 hours. The solvent is removed under reduced pressure from the resultant mixture, and the residue is treated with ethyl ether to give crystals of 9-chloro-4,5-dihydro-7-phenyl-2H-(1,2,4)oxadiazolo(2,3-a)(1,5)-benzodiazocin-2-one. Melting point: 166° to 167°C(decomposition). IR absorption spectrum of this product is identical with that of the product obtained in Part B(1).

(6) To 0.3 part of 2-amino-8-chloro-3,4-dihydro-6-phenyl-1,5-benzodiazocine 1 N-oxide in 6 volume parts of chloroform is added 0.3 volume part of triethylamine and then is added with stirring under ice-cooling 0.17 part of thiophosgene in 1.5 volume part of benzene. After stirring for 20 minutes, the resultant is extracted with chloroform. The chloroform layer is washed with water and dried over sodium sulfate. Solvent is removed from the resultant mixture and the residue is treated with ethyl ether, whereby 9-chloro-4,5-dihydro-7-phenyl-2H-(1,2,4)oxadiazolo(2,3-a)(1,5)-benzodiazocine-2-thione are obtained as pale yellow crystals. Recrystallization from acetone gives pale yellow prisms melting at 143° to 147°C (decomposition).

---

Elementary analysis: $C_{17}H_{12}ClN_3OS$.
Calculated: C 59.73, H 3.53, N 12.29.
Found: C 59.84, H 3.88, N 12.02.

---

(7) In a similar manner to the foregoing examples, the following compounds are produced:

. 4,5-dihydro-7-phenyl-2H-(1,2,4)oxadiazolo(2,3-a)-(1,5)benzodiazocin-2-one; colorless needles melting at 171° to 172°C(decomposition) (recrystallization from acetone-n-hexane).

. 9-chloro-4,5-dihydro-4-methyl-7-phenyl-2H-(1,2,4)-oxadiazolo(2,3-a)(1,5)benzodiazocin-2-one; colorless prisms melting at 147° to 148°C (decomposition) (recrystallization from methanol)

. 9-chloro-4,5-dihydro-4-ethyl-7-phenyl-2H-(1,2,4)-oxadiazolo(2,3-a)(1,5)benzodiazocin-2-one; colorless prisms melting at 145° to 146°C (decomposition)(recrystallization from methanol)

. 9-chloro-4,5-dihydro-5-methyl-7-phenyl-2H-(1,2,4)-oxadiazolo(2,3-a)(1,5)benzodiazocin-2-one;

colorless flakes melting at 177° to 178°C(decomposition) (recrystallization from methanol)

4,5-dihydro-4,9-dimethyl-7-phenyl-2H-(1,2,4)oxadiazolo-(2,3-a)(1,5)benzodiazocin-2-one; colorless needles melting at 143° to 145°C(decomposition)(recrystallization from acetone-n-hexane)

4,5-dihydro-4-ethyl-9-methyl-7-phenyl-2H-(1,2,4)-oxadiazolo(2,3-a)(1,5)benzodiazocin-2-one; colorless prisms melting at 145° to 146°C(decomposition)(recrystallization from acetone-n-hexane)

4,5-dihydro-9,10-dimethoxy-7-phenyl-2H-(1,2,4)-oxadiazolo(2,3-a)(1,5)benzodiazocin-2-one; pale yellow prisms melting at 150° to 152°C(decomposition)(recrystallization from acetone-n-hexane)

9-chloro-7-(4-chlorophenyl)-4,5-dihydro-4-methyl-2H-(1,2,4)oxadiazolo(2,3-a)(1,5)benzodiazocin-2-one; colorless prisms melting at 154° to 155°C (decomposition)(recrystallization from acetone)

9-chloro-4,5-dihydro-7-(4-methoxyphenyl)-2H-(1,2,4)-oxadiazolo(2,3-a)(1,5)benzodiazocin-2-one; colorless prisms melting at 188° to 189°C (decomposition)(recrystallization from acetone)

9-chloro-4,5-dihydro-11-methoxy-7-phenyl-2H-(1,2,4)-oxadiazolo(2,3-a)(1,5)benzodiazocin-2-one; colorless prisms melting at 200° to 201°C (decomposition)(recrystallization from acetone).

What is claimed is:

1. A compound of the formula

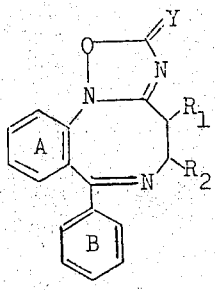

wherein Y is O or S, $R_1$ and $R_2$ are hydrogen or lower alkyl of 1 to 2 carbon atoms and rings A and B are unsubstituted or independently may have up to two substituents selected from the group consisting of halogen, trifluoromethyl, lower alkyl of 1 to 4 carbon atoms and lower alkoxy of 1 to 4 carbon atoms, and pharmaceutically acceptable salts thereof.

2. A compound as claimed in claim 1, wherein Y is O.

3. A compound as claimed in claim 1, wherein Y is S.

4. A compound as claimed in claim 1, wherein $R_1$ and $R_2$ are hydrogen.

5. A compound as claimed in claim 1, wherein $R_1$ is hydrogen and $R_2$ is lower alkyl of 1 to 2 carbon atoms.

6. A compound as claimed in claim 1, wherein $R_1$ is lower alkyl of 1 to 2 carbon atoms and $R_2$ is hydrogen.

7. A compound as claimed in claim 1, wherein $R_1$ and $R_2$ are lower alkyl of 1 to 2 carbon atoms.

8. A compound as claimed in claim 1, wherein rings A and B are unsubstituted.

9. A compound as claimed in claim 1, wherein ring A is substituted by halogen, lower alkyl of 1 to 4 carbon atoms or lower alkoxy of 1 to 4 carbon atoms.

10. A compound as claimed in claim 1, wherein ring B is substituted by halogen or lower alkoxy of 1 to 4 carbon atoms.

11. A compound as claimed in claim 1, wherein the compound is 9-chloro-4,5-dihydro-7-phenyl-2H-(1,2,4)oxadiazolo(2,3-a)(1,5)benzodiazocin-2-one.

12. A compound as claimed in claim 1, wherein the compound is 4,5-dihydro-7-phenyl-2H-(1,2,4)oxadiazolo(2,3-a)(1,5)-benzodiazocin-2-one.

13. A compound as claimed in claim 1, wherein the compound is 9-chloro-4,5-dihydro-7-phenyl-2H-(1,2,4)oxadiazolo(2,3-a)(1,5)benzodiazocine-2-thione.

14. A compound as claimed in claim 1, wherein the compound is 9-chloro-4,5-dihydro-4-methyl-7-phenyl-2H-(1,2,4)oxadiazolo(2,3-a)(1,5)benzodiazocin-2-one.

15. A compound as claimed in claim 1, wherein the compound is 9-chloro-4,5-dihydro-4-ethyl-7-phenyl-2H-(1,2,4)oxadiazolo-(2,3-a)(1,5)benzodiazocin-2-one.

16. A compound as claimed in claim 1, wherein the compound is 9-chloro-4,5-dihydro-5-methyl-7-phenyl-2H-(1,2,4)oxadiazolo-(2,3-a)(1,5)benzodiazocin-2-one.

17. A compound as claimed in claim 1, wherein the compound is 4,5-dihydro-4,9-dimethyl-7-phenyl-2H-(1,2,4)oxadiazolo-(2,3-a)(1,5)benzodiazocin-2-one.

18. A compound as claimed in claim 1, wherein the compound is 4,5-dihydro-4-ethyl-9-methyl-7-phenyl-2H-(1,2,4)oxadiazolo-(2,3-a)(1,5)benzodiazocin-2-one.

19. A compound as claimed in claim 1, wherein the compound is 4,5-dihydro-9,10-dimethoxy-7-phenyl-2H-(1,2,4)oxadiazolo-(2,3-a)(1,5)benzodiazocin-2-one.

20. A compound as claimed in claim 1, wherein the compound is 9-chloro-7-(4-chlorophenyl)-4,5-dihydro-4-methyl-2H-(1,2,4)oxadiazolo(2,3-a)(1,5)benzodiazocin-2-one.

21. A compound as claimed in claim 1, wherein the compound is 9-chloro-4,5-dihydro-7-(4-methoxyphenyl)-2H-(1,2,4)-oxadiazolo(2,3-a)(1,5)benzodiazocin-2-one.

22. A compound as claimed in claim 1, wherein the compound is 9-chloro-4,5-dihydro-11-methoxy-7-phenyl-2H-(1,2,4)-oxadiazolo(2,3-a)(1,5)benzodiazocin-2-one.

* * * * *